(12) United States Patent
Lee

(10) Patent No.: US 11,178,277 B2
(45) Date of Patent: Nov. 16, 2021

(54) CIRCUIT ID LOOKUP

(71) Applicant: Brandon Donnell Lee, Palmdale, CA (US)

(72) Inventor: Brandon Donnell Lee, Palmdale, CA (US)

( * ) Notice: Subject to any disclaimer, the term of this patent is extended or adjusted under 35 U.S.C. 154(b) by 22 days.

(21) Appl. No.: 14/922,493

(22) Filed: Oct. 26, 2015

(65) Prior Publication Data

US 2017/0118330 A1 Apr. 27, 2017

(51) Int. Cl.
*H04M 3/42* (2006.01)

(52) U.S. Cl.
CPC ............................ *H04M 3/42042* (2013.01)

(58) Field of Classification Search
CPC .................................................. H04M 3/42042
See application file for complete search history.

(56) References Cited

U.S. PATENT DOCUMENTS

| | | | | |
|---|---|---|---|---|
| 6,327,343 B1* | 12/2001 | Epstein | ................. | H04M 1/663 379/88.01 |
| 7,586,898 B1* | 9/2009 | Koch | ................. | H04L 12/1859 370/352 |
| 2009/0213844 A1* | 8/2009 | Hughston | ........... | H04M 3/4872 370/352 |
| 2012/0287823 A1* | 11/2012 | Lin | ................... | H04M 3/42042 370/259 |

\* cited by examiner

*Primary Examiner* — Duc C Ho

(57) ABSTRACT

A new way to make the caller ID service provide more information about the caller more than the caller's number and name. These information could be like a Criminal Background Lookup of the caller, Social Network Lookup, Customer Relationship Management (CRM) Lookup, Address Lookup, Previous Calls and Note Lookup and Credit Check Lookup. In the current caller ID, the provider switch will pass the call to the called phone without waiting the compilation of the caller ID lookup, a method continues to work while the call is in progress checking for additional information requested.

2 Claims, 2 Drawing Sheets

CIRCUIT ID LOOKUP

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The invention relates generally to a unified VoIP communications platform utilized in providing telecommunications services, more particularly, the invention relates to using Caller ID service to provide more information about the caller.

Description of the Related Art

Caller identification or Caller ID used as a way to display a caller's phone number on the recipient's phone device before the call is answered so the call recipient can know who call him and decide either to answer or reject the call, the caller identification service is available and supported by the local telecommunication providers in the majority of countries around the world. There are two types of Caller ID, the first type include the caller's telephone number and the date and time of the call, the second type include the caller's telephone number plus the caller's name. In the current caller ID systems there are some problems, the traditional caller ID is limited due to its design and only providing information such as caller's name etc. The traditional caller ID has to wait on the query to be returned before it sends the call to the called person. The traditional caller id cannot be manipulated based on called group. Today's telecom solution can not automatically perform further searches when new information is available for previous calls.

The invention I provide intelligence and improvement of traditional caller ID to make an intelligent innovation can make the caller ID provide more services than provide the display of the caller's telephone number and name only. Call ID is intelligent in that it can perform further queries based on information it finds. For example, if Call ID finds the social security number of the caller, Call ID can perform a criminal background or credit check. If it finds address information, it can perform searches to determine if the address is registered to any sex offenders etc. Call ID can plugin to other applications such as Skype for Business and can be used independent as a web client or mobile app. The invention features can be controlled based on group permissions dictating what information is displayed based on a user's group. The invention can be configured to perform additional searches at later times.

BRIEF SUMMARY OF THE INVENTION

In one aspect the invention can be used to provide endless information about the calling party that connects with the information found to query for other information. In another aspect the invention can be used to promote simultaneous run and additional querying/lookups while the caller is on the phone.

DESCRIPTION OF THE DRAWINGS

For a more complete understanding of the invention, reference is now made to the following descriptions.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The invention is a new way to make the caller ID service provide more information about the caller more than the caller's number and name. The invention works just like the traditional caller ID but it has several improvements.

Figure 1:
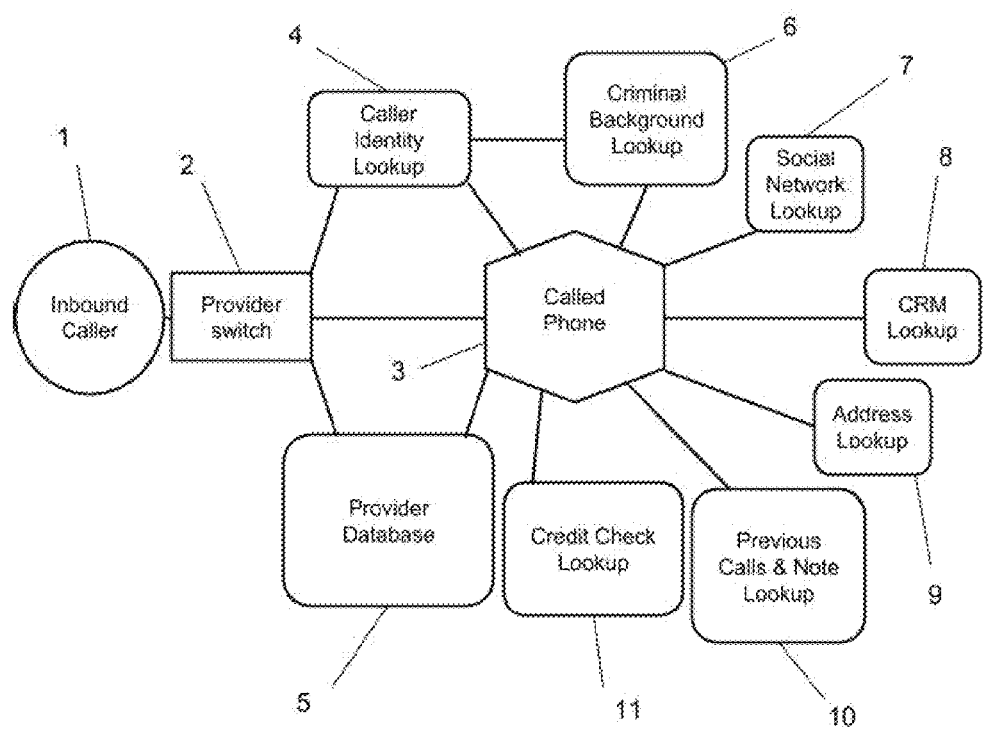
FIG. 1 is a flow chart that depicts an exemplary functional sequence of the caller ID lookup, consistent with at least one embodiment of the invention.

Referring to FIG. 1 a call comes from inbound caller 1 into the provider switch 2 (before it hits the called phone 3). The provider switch 2 creates a request of caller Identity Lookup 4 for information lookup based on the caller's information. Then, the call is sent to the called phone 3 even before the caller identity Lookup 4 is not complete contrary to the traditional caller ID (Note in traditional/current caller ID, the provider switch will not pass the call to the called phone till the caller ID lookup is complete).

This is the reason when you receive a call the caller ID will already be shown. This approach limits the amount of data that can be sent to the called phone 3 and this is what is the invention intended to solve. When the call is received from the provider switch 2 to the called phone 3, the called phone 3 queries the provider database 5 for Call IDs, the Infinite data lookup continues as more databases are connected. The results are displayed on the called phone 3 allowing the called to pop the information (open the URL where the information was retrieved from). This allows the called person to control incoming calls as Call ID helps the called person to decide if the incoming call is an interruption. This happens because Call ID displays the incoming caller's name and phone number right on the screen.

Also the invention continues to work while the call is in progress checking for additional information that has been found. For example these additional information, about the inbound caller 1 could be a Criminal Background Lookup of the caller 6, Social Network Lookup 7, Customer Relationship Management (CRM) Lookup 8, Address Lookup 9, Previous Calls & Note Lookup 10 and Credit Check Lookup 11, we can add more categories of information based on our needs and based on the field of using this invention.

The present invention data is stored in a database and available even after the call has been terminated or when the inbound caller 1 calls again, it can be displayed. This invention allows one to handle calls instantly by ending unwanted calls/interruptions.

Figure 2:
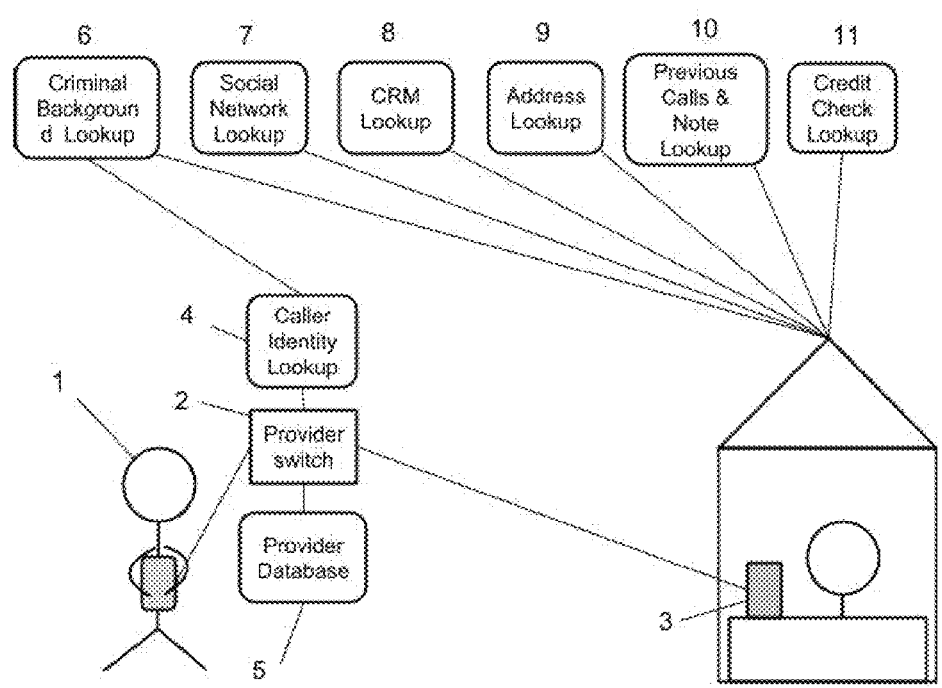
FIG. 2 is an application of the current invention to show how can be used to know more information about the caller.

Referring to FIG. 2 as an application of the current invention, while the Caller ID can be used only by the call recipient to know the caller's telephone number and the caller's name, the Caller ID can be used in other fields more important, for example it can be used by companies when receives calls from jobs applicants to know the certificates obtained and in any university they graduated, know if there is a criminal record, find out whether insured or not, find out if applicant had got loans and has paid off or not and to find out if applicant is legally reside or not.

All these futures can be used by banks, government or by any party need to know all these information about someone. All of these information will be known only when you receive a call from the caller or the targeted person without wasting time on personal interviews or examining papers.

To explain more, suppose that the called phone 3 exist in a company, bank, government institution or in any party need to know more information about someone, and suppose that this company or party need to know a specific information about someone who will call it (inbound caller 1).

Based on that, a call comes from inbound caller 1 that may be a job applicant or any person into the provider switch 2. The provider switch 2 creates a request of Caller Identity Lookup 4 for information lookup based on the caller's information. Then, the call is sent to the called phone 3 in a company, bank or in a governmental institution even before the Caller Identity Lookup 4 is completed contrary to the traditional caller ID. When the call is received from the provider switch 2 to the called phone 3, the invention continues to work while the call is in progress checking for additional information like a Criminal Background Lookup of the caller 6, Social Network Lookup 7, Customer Relationship Management (CRM) Lookup 8, Address Lookup 9, Previous Calls & Note Lookup 10 and Credit Check Lookup 11.

The called phone 3 queries the provider database 5 for Call IDs, the Infinite data lookup continues as more databases are connected. The results are displayed on the called phone 3 allowing the called to pop the information (open the URL where the information was retrieved from). This allows the called person to control incoming calls as Call ID helps you to decide if the incoming call is an interruption. This happens because Call ID displays the incoming caller's name and phone number right on the screen.

The invention claimed is:

1. A method for providing more information than a caller's number and name in a caller ID service comprising:
   receiving, by a provider switch, a call from an inbound caller;
   requesting, by the provider switch, the caller identity lookup, wherein the identity look up includes information comprising criminal background, social network, CRM (Customer Relationship Management), address, previous calls and notes, credit check;
   wherein additional categories of information of the caller including criminal record, graduated university, insured or not, loan paid off or not, legally reside or not, and obtained certificates can be provided to requested companies, a bank or a governmental institution;
   storing the information in a database, and available for retrieving when the same inbound caller calls again;
   sending the call, by the provider switch, to the called phone.

2. A method according to claim 1, further comprising:
   passing the call to the called phone, while the call is in progress checking for additional information requested, by the provider switch, without waiting the compilation of the caller ID lookup.

* * * * *